United States Patent [19]

Hull et al.

[11] Patent Number: 5,718,741
[45] Date of Patent: Feb. 17, 1998

[54] DIRECTLY COOLED, SIDE FIRED FOREHEARTH

[75] Inventors: James D. Hull; Philip D. Perry; Roland F. Pimm, all of Perrysburg, Ohio

[73] Assignee: Owens-Brockway Glass Container Inc., Toledo, Ohio

[21] Appl. No.: 444,498

[22] Filed: May 19, 1995

[51] Int. Cl.$^6$ .................. C03B 5/16; C03B 5/23; C03B 5/42

[52] U.S. Cl. .................. 65/346; 65/356; 65/135.1; 65/136.4

[58] Field of Search .................. 65/135.1, 136.4, 65/137, 346, 347, 326, 342, 337, 356

[56] References Cited

U.S. PATENT DOCUMENTS

| | | | |
|---|---|---|---|
| 1,893,061 | 1/1933 | Peiler | 65/346 |
| 1,900,361 | 3/1933 | Mulholland et al. | 65/346 |
| 2,085,328 | 6/1937 | Peiler | 65/346 |
| 2,144,973 | 1/1939 | Honiss | 65/346 |
| 2,616,380 | 11/1952 | Griffin | |
| 3,999,972 | 12/1976 | Brax | 65/337 |
| 4,294,603 | 10/1981 | Winzer et al. | 65/356 |
| 4,511,385 | 4/1985 | Barkhau et al. | 65/346 |
| 4,604,123 | 8/1986 | Desprez et al. | 65/134 |
| 4,662,927 | 5/1987 | Blumenfeld | 65/346 |
| 4,680,051 | 7/1987 | Blumenfeld et al. | 65/346 |
| 5,055,123 | 10/1991 | Meacle | 65/135.1 |
| 5,169,424 | 12/1992 | Grinnen et al. | 65/346 |
| 5,198,010 | 3/1993 | Ward | 65/135 |
| 5,327,452 | 7/1994 | McMinn | 65/346 |
| 5,383,949 | 1/1995 | Bubon et al. | 65/346 |

FOREIGN PATENT DOCUMENTS

| | | |
|---|---|---|
| 0 145 427 A2 | 6/1985 | European Pat. Off. . |
| 0 275 345 A1 | 7/1988 | European Pat. Off. . |
| 0 403 289 A1 | 6/1990 | European Pat. Off. . |
| 0 503 883 A1 | 3/1992 | European Pat. Off. . |
| 1450020 | 11/1966 | France . |
| 2220480 | 10/1974 | France . |
| 768932 | 5/1955 | United Kingdom . |

*Primary Examiner*—Steven P. Griffin

[57] ABSTRACT

A forehearth (20) for cooling glass from a melting furnace as it flows to a feeder bowl (28) from which it is discharged to a forming machine. The forehearth is in the form of an elongate, horizontally extending insulated trough (26) with a roof formed by a longitudinally extending series of roof block elements (30), each of which is of one-piece construction and extends completely across the width of the insulated trough. The downwardly facing surface of each roof block element is contoured to incorporate concave portions (30a, 30b) near the edges of the forehearth, a concave portion (30c) above the center of the forehearth and convex portions (30d, 30e) separating the center concave portion from the side concave portions to substantially impede heat transfer between the side concave portions and the center concave portion. Burners (32) are positioned along the opposed sides of the forehearth to fire transversely into the spaces underlying the side concave portions of the roof blocks, and cooling air passages (40) extend through the roof blocks to discharge cooling air transversely of the forehearth into the space underlying the center concave portion in direct contact with the glass in the forehearth. A plurality of exhaust openings (34, 42) for products of combustion from the burners and cooling air, respectively are positioned along the length of the forehearth to provide for longitudinal flow of products of combustion and cooling air at rates which are variable along the length of the forehearth.

8 Claims, 5 Drawing Sheets

DIRECTLY COOLED, SIDE FIRED FOREHEARTH

FIELD OF THE INVENTION

This invention relates to a forehearth for cooling a stream of molten glass as it flows from a melting furnace to a forming machine. More particularly, this invention relates to forehearth of the foregoing character with direct cooling of the center of the glass stream and heating of the sides of the stream by burners positioned along the sides of the forehearth and firing transversely of the forehearth.

BACKGROUND OF THE INVENTION

In the manufacture of glass products, for example, blown glass containers, it is customary to provide a relatively narrow, elongate conditioning chamber, usually called a forehearth, to cool the glass to a proper relatively uniform temperature as it flows from a glass melting furnace to a forming machine. A typical forehearth is in the shape of an insulated, horizontal trough and is provided with an insulated roof structure.

It is known that the temperature of the glass flowing through a forehearth tends to be nonuniform across the width of the forehearth due to the fact that the loss of heat through the sides of the forehearth tends to make the edge portions of the glass stream in the forehearth cooler than the central portion of the glass stream. For this reason, it is known to provide burners or other heating means to impart heat to the edge portions of the glass stream in the forehearth and to provide means for cooling the central portion of the glass streams in the forehearth relative to the side portions.

The cooling of a modern glass forehearth typically involves the flowing of ambient air along the center line of the forehearth and above the glass in the forehearth, either out of physical contact with the glass in the forehearth, in which case the forehearth is often referred to as an indirectly cooled forehearth, or in contact with the glass in the forehearth, in which case the forehearth is known as a directly cooled forehearth. U.S. Pat. Nos. 4,680,051 (Blumenfeld et al.) and 5,169,424 (Grinnen et al.) disclose forehearths of an indirectly cooled nature, and U.S. Pat. Nos. 4,511,385 (Barkhau et al.) and 3,999,972 (Brax) disclose forehearths of the directly cooled type. The disclosure of each of the foregoing U.S. patents is incorporated by reference herein.

Cooling of the glass in a forehearth of either the directly cooled or indirectly cooled type tends to be predominantly by radiation from the warm upper surface of the glass stream in the forehearth to the cooler inside surface of the roof structure immediately above center of the forehearth. The cooling air, in a directly cooled forehearth, directly cools the radiation energy receiving surface of the forehearth roof structure, whereas the cooling air in an indirectly cooled forehearth cools a surface that is separated from the radiation receiving surface by a finite thickness of a refractory or other material of only a moderately conductive nature. Thus, the temperature control system for controlling the cooling in a directly cooled forehearth is capable of responding more rapidly to correct glass temperature conditions when they depart from predetermined ideal temperature conditions. Glass temperature uniformity is especially important in modern glass container forming operations, where glass gob weight is very important for quality and glass container volume control, because the weight of a glass gob from which a container is formed is dependent on the viscosity of the glass stream from which the gob is formed, and the viscosity of a glass stream is a function of its temperature.

The roof structure of a directly cooled forehearth of the type illustrated in the aforesaid U.S. Pat. No. 4,511,385 is a very complex structure, being formed from a longitudinally extending series of elements each of which consists of a transverse array of a plurality of individual pieces. The pieces in each transverse array collectively are provided with a complex shape, in a transverse direction, in order to define longitudinally extending barriers to confine the flow of cooling air to the central portion of the forehearth and the flow of products of combustion from the side heating burners to the side regions of the forehearth. Such a multiple piece roof structure is difficult to install, and there is a tendency for the individual pieces to shift with respect to one another over a period of time, thus opening up cracks or spaces between the adjacent surfaces of adjacent blocks in the roof structure. Further, for optimum control of the temperature uniformity of the glass stream within a forehearth, it is desirable to control the firing of the burners on each side of the forehearth independently of the burners on the other side of the forehearth, and known directly cooled forehearths were not provided with such independent firing control systems. This factor is especially important in modern forehearth installations, which tend to be wider than their earlier counterparts to provide longer glass residence times.

BRIEF DESCRIPTION OF THE INVENTION

In accordance with the present invention there is provided a directly, center line cooled forehearth in which the forehearth roof structure is made up of a longitudinally extending series of roof block elements, each of which extends completely across the width of the forehearth. Each roof block element is provided with suitable multiple side inlet and multiple longitudinally spaced, transversely extending inlet passages for cooling air, to provide for the closely controllable generally longitudinal flow of cooling air above the center of the glass stream in the forehearth. Each roof block element is also provided with outlets for combustion products from side mounted forehearth burners to exhaust the combustion products from the edges of the forehearth, and each is provided with a contoured arrangement to substantially physically isolate the edge portions of the glass stream in the forehearth, which are being heated, from the central portion of the glass stream, which is being cooled. Further, forehearth roof blocks of the foregoing character for use in the final, equalizing zone of the forehearth, immediately upstream of the molten glass outlet from the forehearth, are provided with an inwardly tapering width as they extend toward the forehearth outlet, to ensure that all portions of the glass stream in the forehearth will flow from the forehearth in a timely manner.

Accordingly, it is an object of the present invention to provide an improved center line cooled glass forehearth. More particularly, it is an object of the present invention to provide a directly cooled forehearth of the foregoing character.

For a further understanding of the present invention and the objects thereof, attention is directed to the drawing and the following brief description thereof, to the detailed description of the preferred embodiment, and to the appended claims.

DETAILED DESCRIPTION OF THE PREFERRED EMBODIMENT

Figure 1:
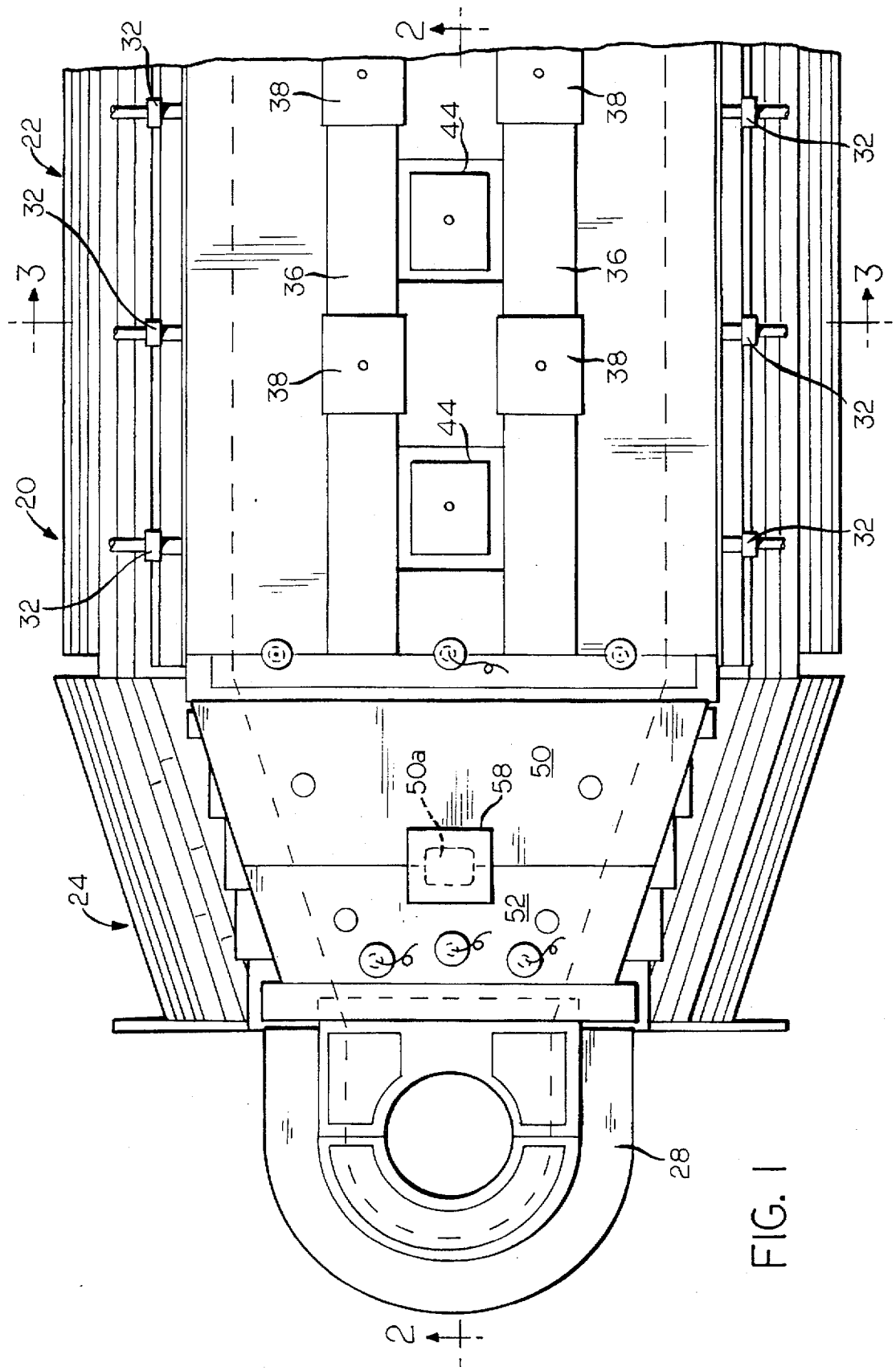
FIG. 1 is a fragmentary plan view of a forehearth according to the preferred embodiment of the present invention.

A forehearth according to the preferred embodiment of the present invention is indicated generally by the reference numeral 20 in the drawing, and the forehearth 20 is made up of a cooling section, which is generally designated by the numeral 22, and by an equalizing section, which is generally designated by the numeral 24. The forehearth 20 is in the form of an elongate, horizontally extending insulated trough 26 through which molten glass from a glass melting furnace, not shown, flows from the right to the left of the drawing, as illustrated in FIGS. 1 and 2, to a glass feeder bowl 28, from which it is discharged by gravity to a glass forming machine, also not shown.

Figure 2:
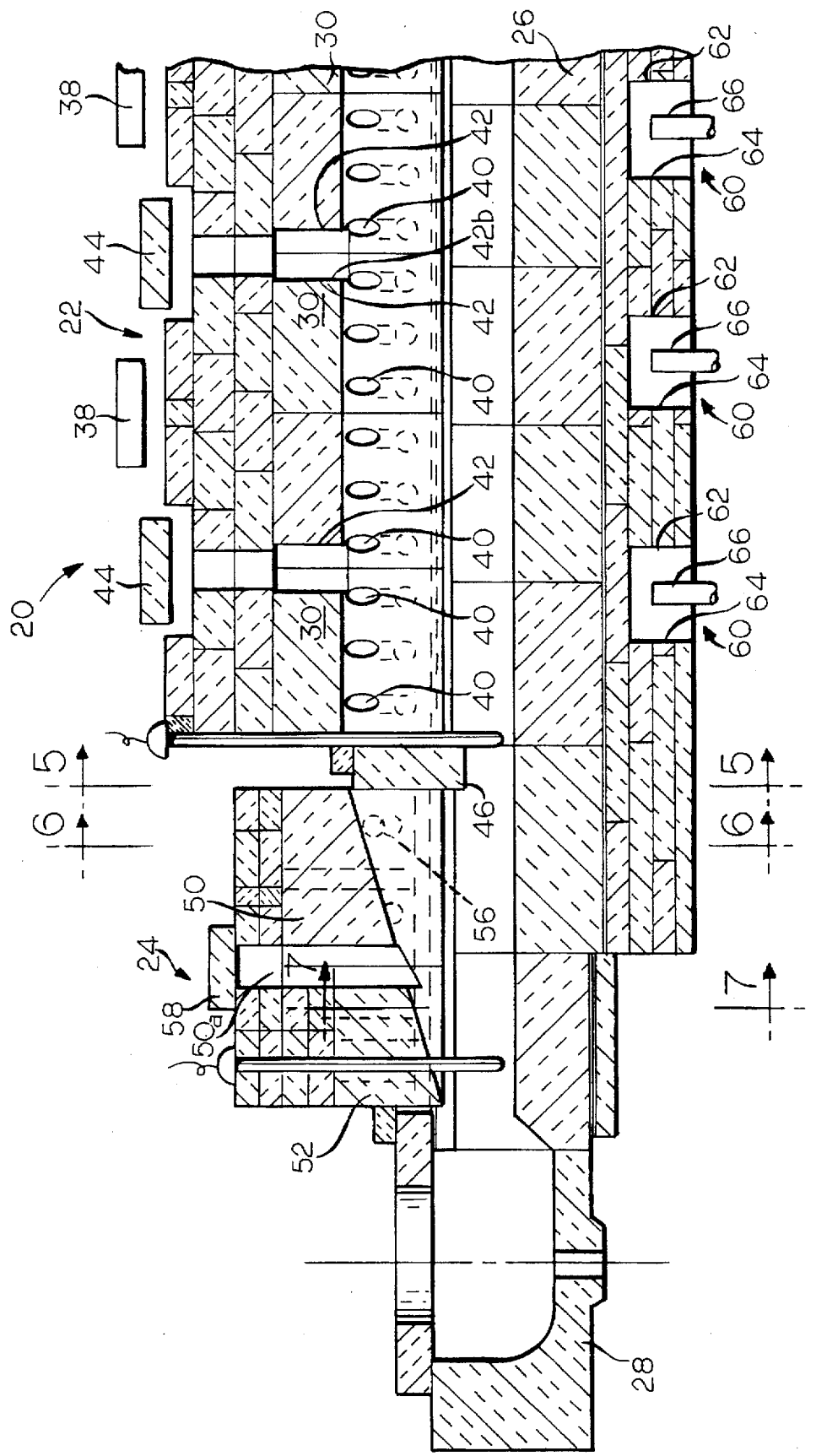
FIG. 2 is a sectional view taken on line 2—2 of FIG. 1.
Figure 4:
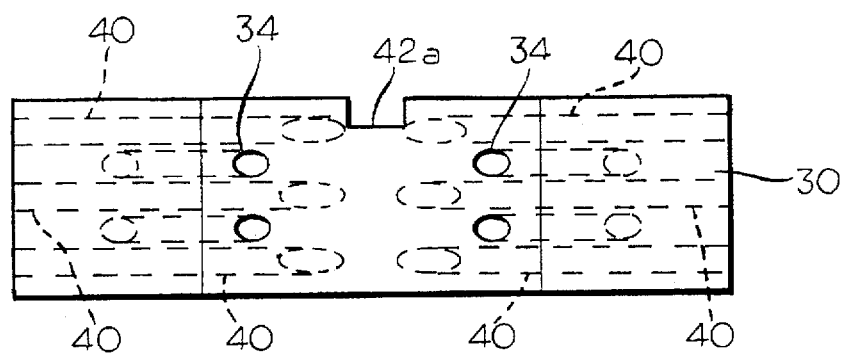
FIG. 4 is a plan view of an element of the forehearth of FIGS. 1–3.
Figure 3:
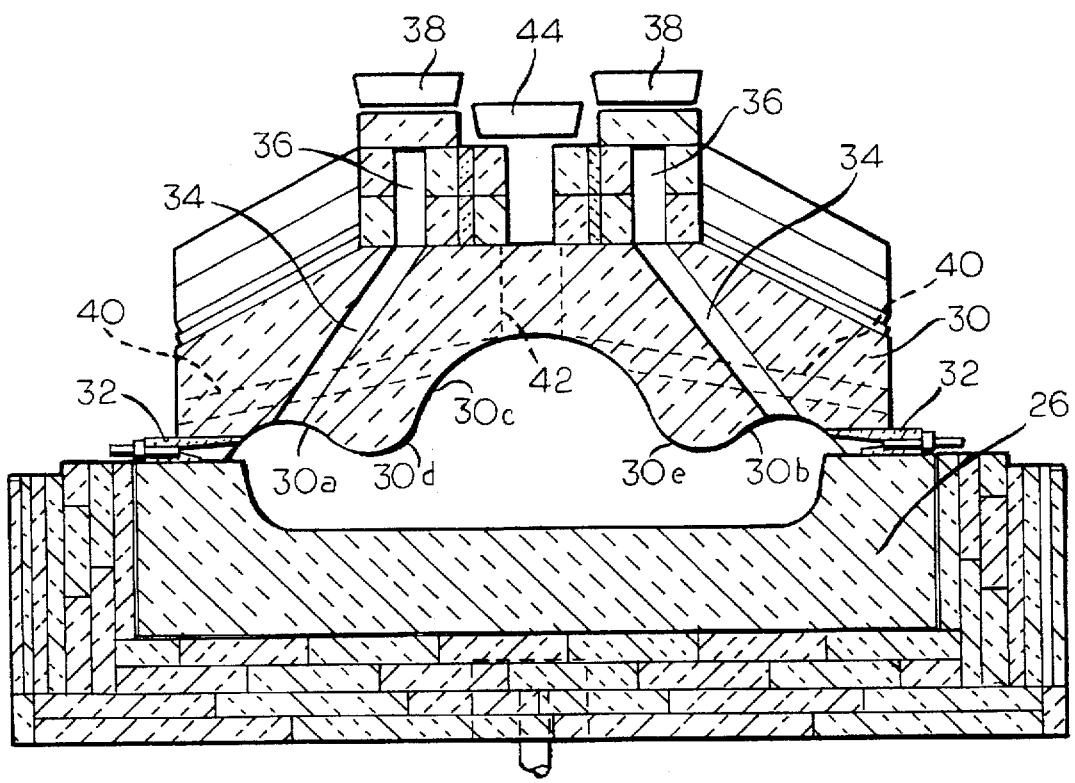
FIG. 3 is a sectional view taken on line 3—3 of FIG. 1.
Figure 5:
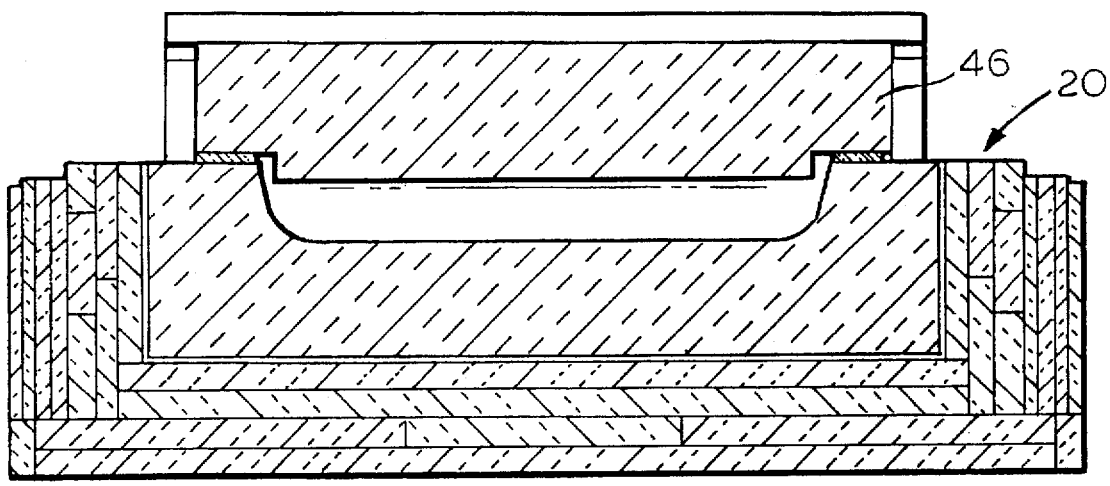
FIG. 5 is a sectional view taken on line 5—5 of FIG. 2.

As is shown in FIGS. 2 and 3, the cooling section 22 of the forehearth 20 is covered by a longitudinally extending series of roof blocks 30 each of which extends completely from side to side of the insulated trough 26. Each roof block 30 is cast from a suitable refractory material and has an innermost surface with concave portions 30a, 30b extending longitudinally of the forehearth 20 adjacent its sides, a concave portion 30c extending longitudinally of the forehearth 20 above its centerline, and convex portions 30d and 30e separating the concave portions 30a, 30c and 30b, 30c, respectively. Burners 32, preferably of a gas-fired type, are mounted along opposite sides of the forehearth 20 and are oriented to fire transversely with respect to the direction of glass flow through the forehearth 20. The burners 32 heat the portions of the glass stream in the forehearth 20 that are adjacent the outer edges of the forehearth, but are not effective to significantly heat the glass in the central region of the forehearth because of the presence of the convex portions 30d, 30e of the roof block 30, which substantially confine the flow of the products of combustion from the burners 32 to the outer regions of the forehearth 20, and impede radiation heat transfer between the outer regions of the forehearth and the central region. In that regard, the roof block 30 is provided with exhaust passages 34 cast therein to exhaust products of combustion from the burners 32 from the forehearth 20 at locations underlying the concave portions 30a, 30b of the roof block 30. The exhaust passages 34 along each side of each roof block 30 discharge into a longitudinally extending duct 36, and are exhausted from each of the ducts 36 at longitudinally spaced apart openings each of which is provided with an adjustable damper block 38, shown schematically, to control the draft within the ducts 36. Preferably, the firing of the burners 32 on one side of the forehearth 20 will be controlled independently of the firing of the burners 32 on the other side of the forehearth 20 for optimum temperature uniformity of the molten glass flowing through the forehearth 20. This is especially important for forehearths intended to process amber glass compositions, because such compositions are quite sensitive to high temperature differentials.

The portion of the molten glass stream within the forehearth 20 that underlies the concave portion 30c of the roof block 30 is cooled primarily by radiation cooling to the internal surface of the concave portion 30c, which is positively cooled by flowing a stream of air or other gaseous coolant thereunder. The air is introduced into the forehearth 20 from one or more blowers, not shown, through a multiplicity of transversely extending longitudinally spaced passages 40 to flow along the centerline of the forehearth 20 to one or another of a longitudinal series of cooling air outlets 42. The convex portions 30d, 30e of the inner surface of each roof block 30 substantially impede the flow of cooling air to the outer regions of the forehearth 20, that is, those underlying the concave portions 30a, 30b, and substantially impede the flow of products of combustion from the outer regions of the forehearth to the region underlying the internal surface of the concave portion 30c. The cooling air outlets 42 are formed by opposed recesses 42a, 42b in adjacent ends of adjacent roof blocks 30, and each of the outlets 42 is provided with an adjustable damper block 44, shown schematically, to control the draft within the associated outlet 42. The damper blocks 44 permit maintenance of positive pressures within the cooling section 22. Air flow rate is controlled by the positions of the damper blocks 44 or through the use of a variable speed fan.

The juncture between the cooling section 22 and the equalizing section 24 of the forehearth 20 is separated by a refractory bridge element 46 that extends transversely of the forehearth 20 from a location above the glass flowing therethrough downwardly to a location just slightly above the level of the glass therein. The bridge element 46 serves to isolate the cooling section 22 from the equalizing section 24 to prevent heat transfer by radiation therebetween and to permit maintenance of different internal pressures within the cooling section 22 and the equalizing section 24 when desired.

Figure 8:
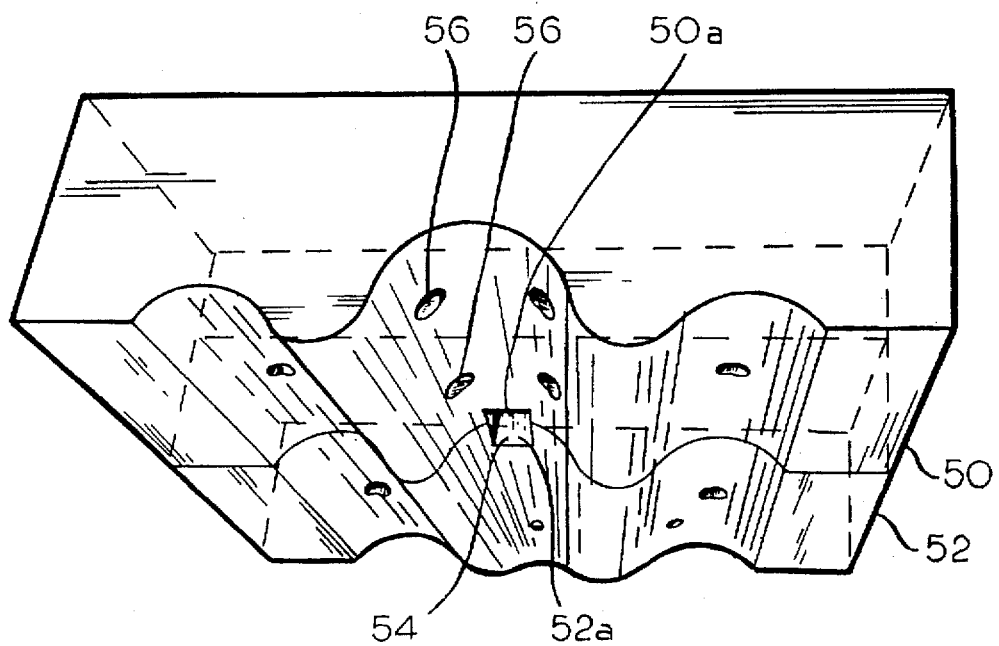
FIG. 8 is a perspective view of a portion of the forehearth of FIGS. 1–3.
Figure 7:
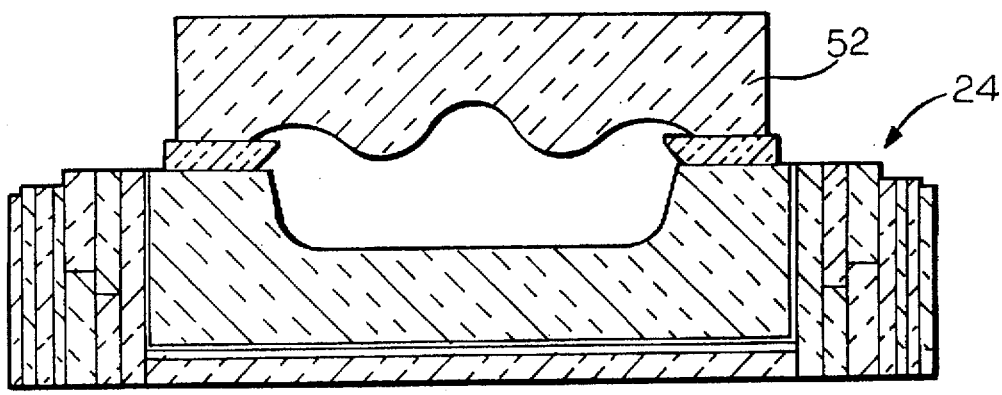
FIG. 7 is a sectional view taken on line 7—7 of FIG. 2.
Figure 6:
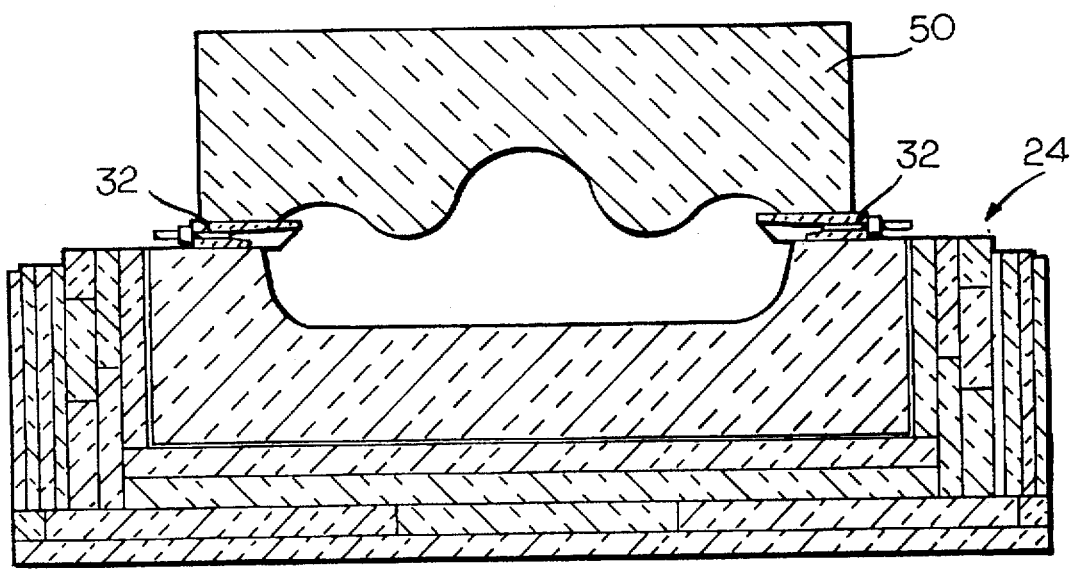
FIG. 6 is a sectional view taken on line 6—6 of FIG. 2.

As is clear from FIG. 1, the transverse width of the glass flow portion of the feeder bowl 28 is substantially less than the glass flow width of the cooling section 22 of the forehearth 20. To avoid dead spots in the molten glass in the equalizing section 24 of the forehearth 20 as a result of the reduced glass flow width in the feeder bowl 28 relative to the cooling section 22, the equalizing section 24 of the forehearth 20 is provided with an inward taper in the direction of flow of molten through the forehearth 20. Thus, the width of the stream of molten glass flowing from the equalizing section 24 to the feeder bowl 28 is substantially the same as the width of the feeder bowl 28, and the roof of the equalizing section 24 is defined by one or more, but preferably two, roof block elements 50, 52. The roof block elements 50, 52 have a shape, in the transverse direction, that is similar to the shape of each roof block element 30, as is shown most clearly in FIG. 8. Further, as is shown in FIG. 2, the roof block elements 50, 52 have a downward taper extending in the longitudinal direction to gradually reduce the distance between the inner surface of each roof block element 50, 52 and the molten glass stream flowing therebelow. If desired, additional burners 32 can be placed on opposite sides of the equalizing section 24, preferably on the upstream or roof block element 50 end thereof, as is shown in FIG. 6. In any case, the adjacent ends of roof block elements 50, 52 are provided with opposed mating recesses 50a, 52a to define an outlet 54 for cooling air from the equalizing section 24, and air inlet passages 56 are provided in the roof block element 50 to introduce cooling air into the equalizing section, if additional cooling of the glass stream flowing therethrough is required. The equalizing section 24 is also provided with a damper block 58, shown schematically, to control the draft within the outlet 54.

If it is desired to add to the glass cooling capacity of the forehearth 20, for example, when processing a glass composition whose melting temperature is higher than the glass compositions originally processed in the forehearth, additional cooling capacity may be added by providing the cooling section 22 with a longitudinally spaced apart plurality of bottom cooling units 60. Each bottom cooling unit includes a blind hole 62 in the underside of the insulated trough 26 and centered along the longitudinal central axis of the trough 26. Each blind hole 62 is preferably added when the forehearth 20 is at an elevated temperature, to avoid distortion or misalignment due to thermal expansion, and a closed end metallic canister 64 is inserted in each blind hole 62. Air or other cooling air is then caused to flow into each canister 64 from an inlet pipe 66, show fragmentarily. If the added bottom cooling provided by the cooling units 60 ceases to be needed, the canister 64 and inlet pipes 66 can be removed and the blind holes 62 closed with refractory. If desired, each blind hole 62 can extend through the refractory to the final layer of refractory, or even entirely through the refractory to the glass channel for maximum cooling effect.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed:

1. A forehearth for cooling molten glass from a glass melting furnace as it flows to a forming machine, said forehearth extending in a longitudinal direction and constructed and arranged to have molten glass to a predetermined level therein and comprising:

an elongate, generally horizontally extending insulated trough having an inlet end constructed and arranged to receive molten glass from a glass melting furnace and an outlet end constructed and arranged to discharge molten glass to a forming machine;

a roof structure covering at least a portion of said insulated trough, said roof structure comprising a longitudinally extending series of refractory roof block elements, each of the roof block elements being of one-piece construction and extending transversely of said insulated trough from one side of said insulated trough to the other side of said insulated trough, each of said roof block elements having an inner surface with first and second downwardly facing and longitudinally extending concave surface portions, a third downwardly facing and longitudinally extending concave surface portion between said first and second downwardly facing concave surface portions and first and second downwardly facing and longitudinally extending convex surface portions, one of said first and second convex surface portions being positioned between said third concave surface portion and one of said first and second concave surface portions and being constructed and arranged to substantially impede heat transfer therebetween, the other of said first and second convex surfaces being positioned between said third concave surface portion and the other of said first and second concave surface portions and being constructed and arranged to substantially impede heat transfer therebetween, a plurality of generally transversely extending passages in said roof structure, said plurality of generally transversely extending passages being arranged in a longitudinally extending array, each of said passages terminating in an opening positioned between said first and second convex surface portions, for introducing a cooling medium into said forehearth in direct contact with said third concave surface portion of said inner surface, at least one cooling medium outlet from said forehearth, said at least one cooling medium outlet being longitudinally spaced from at least some of said plurality of passages, for withdrawing cooling medium from said forehearth;

longitudinally extending first and second pluralities of generally opposed, generally transversely extending burners, the burners of the first plurality firing into a first space underlying said first concave surface portion, the burners of the second plurality firing into a second space underlying said second concave surface portion;

a refractory bridge element extending across said insulated trough at a location between said inlet end and said outlet end, said refractory bridge element projecting downwardly toward the level of molten glass in said forehearth and separating said forehearth into a cooling section and an equalizing section, said forehearth gradually becoming narrower in transverse width as it proceeds from said refractory bridge element to said outlet end, said series of roof block elements being positioned over said cooling section; and at least one equalizing section roof block element covering at least a portion of said equalizing section, said at least one equalizing section roof block element having an inner surface whose shape, in transverse cross-section, is the same as that of each of said roof block elements, the inner surface of said at least one equalizing section roof block element further having a taper in the longitudinal direction to gradually decrease the distance between the inner surface of said equalizing section roof block element and an upper surface of a stream of molten glass flowing thereunder.

2. A forehearth according to claim 1 wherein said at least one cooling medium outlet is formed by a recessed portion in one of said roof block elements and an opposed recessed portion in an adjacent one of said roof block elements.

3. A forehearth according to claim 1 and further comprising:

a second plurality of generally transversely extending passages in said roof structure, said second plurality of generally transversely extending passages being arranged in a longitudinally extending array, each one of said second plurality of generally transversely extending passages being opposed to one of said plurality of generally transversely extending passages and terminating in a second opening positioned between said first and second convex surface portions for introducing additional cooling medium into said forehearth in direct contact with said third concave surface portion of said inner surface.

4. A forehearth according to claim 1 wherein said at least a portion of said insulated trough extends substantially from the inlet end to said refractory bridge element.

5. A forehearth according to claim 1 and further comprising:

first and second exhaust passages for exhausting products of combustion from said first and second spaces, respectively, said first exhaust passages being longitudinally spaced from said first plurality of burners, said second exhaust passages being longitudinally spaced from said second plurality of burners.

6. A forehearth for cooling molten glass from a glass melting furnace as it flows to a forming machine, said forehearth extending in a longitudinal direction and constructed and arranged to have molten glass to a predetermined level therein and comprising:

an elongate, generally horizontally extending insulated trough having an inlet end constructed and arranged to receive molten glass from a glass melting furnace and an outlet end constructed and arranged to discharge molten glass to a forming machine;

a roof structure covering at least a portion of said insulated trough, said roof structure comprising a longitudinally extending series of refractory roof block elements, each of the roof block elements being of one-piece construction and extending transversely of said insulated trough from one side of said insulated trough to the other side of said insulated trough, each of said roof block elements having an inner surface with first and second downwardly facing and longitudinally extending concave surface portions, a third downwardly facing and longitudinally extending concave surface portion between said first and second downwardly facing concave surface portions and first and second downwardly facing and longitudinally extending convex surface portions, one of said first and second convex surface portions being positioned between said third concave surface portion and one of said first and second concave surface portions and being constructed and arranged to substantially impede heat transfer therebetween, the other of said first and second convex surfaces being positioned between said third concave surface portion and the other of said first and second concave surface portions and being constructed and arranged to substantially impede heat transfer therebetween, a plurality of generally transversely extending passages in said roof structure, said plurality of generally transversely extending passages being arranged in a longitudinally extending array, each of said passages terminating in an opening positioned between said first and second convex surface portions, for introducing a cooling medium into said forehearth in direct contact with said third concave surface portion of said inner surface, at least one cooling medium outlet from said forehearth, said at least one cooling medium outlet being longitudinally spaced from at least some of said plurality of passages, for withdrawing cooling medium from said forehearth;

longitudinally extending first and second pluralities of generally opposed, generally transversely extending burners, the burners of the first plurality firing into a first space underlying said first concave surface portion, the burners of the second plurality firing into a second space underlying said second concave surface portion;

a refractory bridge element extending across said insulated trough at a location between said inlet end and said outlet end, said refractory bridge element projecting downwardly toward the level of molten glass in said forehearth and separating said forehearth into a cooling section and an equalizing section, said forehearth gradually becoming narrower in transverse width as it proceeds from said refractory bridge element to said outlet end, said series of roof block elements being positioned over said cooling section; and a longitudinally extending plurality of equalizing section roof block elements covering substantially all of said equalizing section, each of said equalizing section roof block elements having an inner surface whose shape, in transverse section is the same as that of each of said roof block elements, the inner surface of each of said equalizing section roof block elements further having a taper, in the longitudinal direction, to gradually decrease the distance between the inner surface of said each of said equalizing section roof block elements and an upper surface of a stream of molten glass flowing thereunder.

7. A forehearth according to claim 6 wherein said at least one cooling medium outlet comprises a longitudinally extending plurality of cooling medium outlets and wherein said forehearth is further provided with an equalizing section cooling medium outlet centrally positioned above the stream of molten glass flowing thereunder.

8. A forehearth according to claim 7 wherein said equalizing section cooling medium outlet is formed by a recessed portion in an end of one of said equalizing section roof block elements and an opposed recessed portion in an end of an adjacent one of said equalizing section roof block elements.

* * * * *